United States Patent Office
2,776,408
Patented Jan. 1, 1957

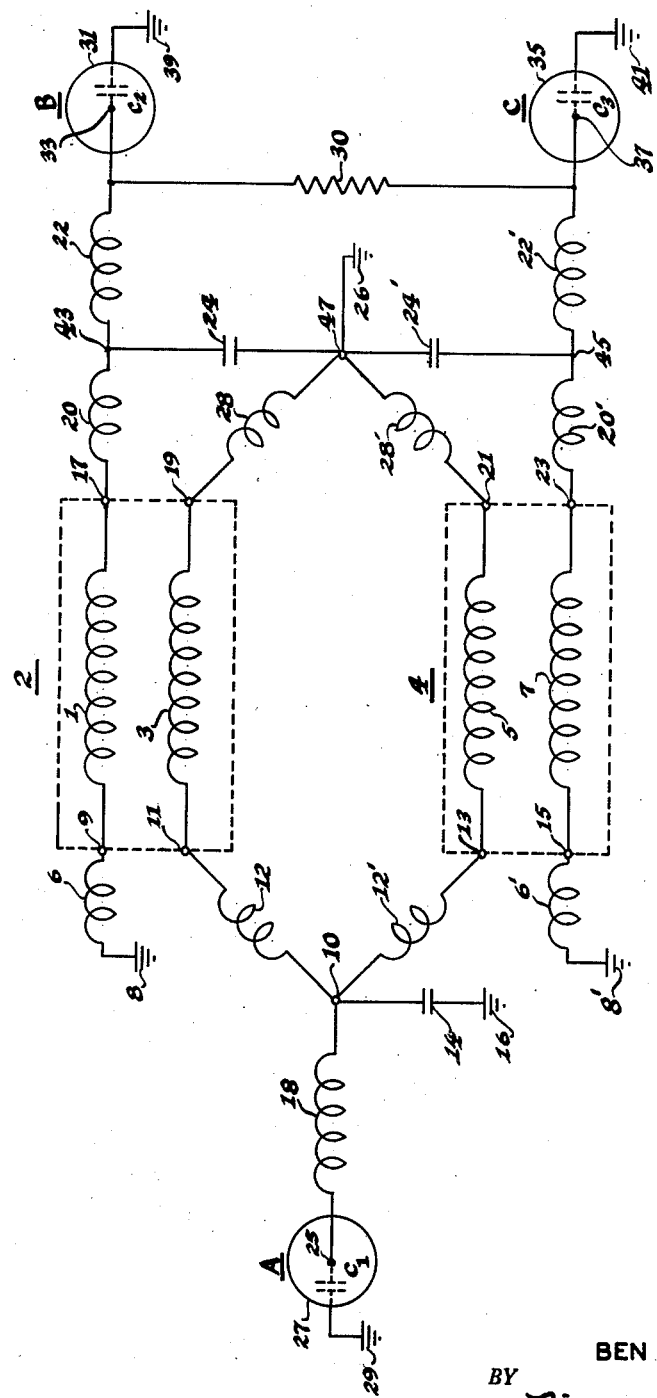
INVENTOR.
BEN H. TONGUE
BY Rines and Rines
ATTORNEYS

2,776,408

HIGH FREQUENCY TRANSMISSION LINE
COUPLING NETWORK

Ben H. Tongue, Westfield, N. J.

Application June 7, 1955, Serial No. 513,809

6 Claims. (Cl. 333—8)

The present invention relates to distribution systems, and more particularly to electric networks and systems that permit the independent feeding of alternating-current energy from a source to a plurality of loads.

It has heretofore been proposed to accomplish the feeding of alternating-current energy from a source of such energy to a plurality of loads with the aid of a plurality of quarter-wave transmission lines, sometimes termed "directional couplers." In accordance with such proposals, a source is connected to the input of each of, for example, a pair of quarter-wave coaxial transmission-line sections of, say, 75 ohms impedance. Impedance-matching transformers, such as appropriate lengths of transmission line, are usually utilized to match the source to the coaxial-line sections. With the inputs of the 75-ohm coaxial lines thus connected in parallel to the source, the matching transformers will enable the source effectively to present an impedance of about 37½ ohms, in the above illustration. Each quarter-wave coaxial-line section may then be terminated with a 75-ohm load connected between the inner and grounded outer conductors of the coaxial-line sections. Through the expedient of a resistive connection between the inner conductors of the two coaxial-line sections at the load end, the energy fed to each of the loads is rendered independent of the energy fed to the other load. This is because any energy flowing from one load to the other will have to pass through both quarter-wave coaxial-line sections and thus through a half-wavelength path, reversing the phase of the energy. The energy flowing through the before-mentioned resistive connection between the inner conductors of the line sections at the load ends of the line sections, on the other hand, will not be phase-reversed and will thus cancel the phase-reversed energy, rendering the loads isolated from one another.

Such devices, however, have serious limitations in that they depend upon the use of, for example, coaxial transmission-line sections a quarter wavelength long, or odd multiples thereof, which inherently require a device of quite sizeable proportions for frequencies or wavelengths in, for example, the V. H. F. television bands or the FM bands. In addition, the degree of isolation between the plurality of loads is dependent upon the accuracy of the adjustment of the length of the coaxial-line sections, and such lines are inherently unsatisfactory broad-band devices, being effective only in the neighborhood of the single frequency for which the lines are designed to have a quarter-wavelength dimension. In addition, it is essential that the outer-conductor input terminal and the corresponding outer-conductor output terminal of each quarter-wave line section be grounded. There are decided advantages, however, as later discussed, in having all of the input and output terminals un-grounded and in being able to connect one input terminal and the opposite, not the corresponding, output terminal through impedances to ground.

An object of the present invention is to provide a new and improved electric system for permitting the simultaneous feeding of energy from a source to a plurality of loads without interaction between the loads, and that shall not be subject to any of the above-described disadvantages. In summary, in accordance with the present invention, bifilar inductors are utilized that are of electrical length less than the quarter-wavelength value above stated, and that are employed in conjunction with $\pi$ and double-L-section low-pass filters to provide wide band operation while permitting the input and output terminals of the inductors to be maintained at a radio-frequency potential above ground. The term "ground," as utilized herein, is intended to connote not only actual earthing, but, also, chassis potential or similar other reference potential.

An additional object is to provide such a system that shall be of low manufacturing cost and of very small dimensions even for V. H. F., FM and lower-frequency bands.

Other and further objects will be explained hereinafter and will be more particularly pointed out in the appended claims. The invention will be described in connection with the accompanying drawing the single figure of which is a schematic circuit diagram of a preferred embodiment of the invention.

Two pairs of coiled-wire inductors forming transmission-line means are shown at 2 and 4 comprising the respective inductors 1, 3 and 5, 7. The inductors of each pair are preferably wound in bi-filar fashion, that is, parallely, upon cylindrical insulating tubes or forms, not shown. The pairs of inductors 2 and 4 are each provided with respective input terminals 9, 11 and 13, 15, and respective output terminals 17, 19 and 21, 23. The effective electrical length of the pairs of inductors between the input and output terminals, unlike the length of the transmission-line sections of the prior-art directional couplers, must, in accordance with the present invention, be less than the quarter-wavelength of the mid-frequency of the lowest band of frequencies to be utilized in the system. In the case of operation with the low and high television V. H. F. bands, for example, where the mid-frequency of the high band is substantially three times that of the low band, the effective electrical length of the pairs of inductors 2 and 4 must be less than substantially a quarter-wavelength of the mid-frequency of the low frequency band, i. e., less than a quarter of the wavelength of a frequency of about 72 megacycles. While the invention will be hereinafter described as applied to television frequencies, this is but by way of illustration, it being understood that the invention is adapted for use at any other desired frequencies.

The alternating-current energy, as in the form of a V. H. F. television radio-frequency signal, in the above illustration, may be fed to the terminals of a connector A. The connector A may, for example, be connected to a coaxial or other transmission line, not shown, that connects to a receiving antenna system or any other source of energy. It may be of the conventional coaxial type having an inner conductor 25 and outer conductor 27, preferably grounded as at 29. Such conventional coaxial connectors have a length and configuration such that they present a shunt capacitive reactance between the inner conductor 25 and the outer conductor 27 over the low and high television bands, as shown dotted at $C_1$. In accordance with the present invention, the signals fed to the connector A are to be distributed to a plurality of outlets, such as the pair of coaxial outlet-connectors B and C, which may be of form similar to that of the connector A. The outlets B and C each have respective outer and inner conductors 31, 33 and 35, 37, with the outer conductors 31 and 35 grounded, as at 39 and 41, and the capacitance between the inner and outer conductors respectively represented at $C_2$ and $C_3$, in dotted lines.

Before proceeding to describe the operation of the network of the present invention, it will conduce to clarity first to describe the various circuit elements associated therewith.

The right-hand terminals of each of a pair of similar inductances 6 and 6' are connected to the respective input terminals 9 and 15 of the pairs of inductors 2 and 4. The terminals 9 and 15 are not at radio-frequency ground potential, but the inductances 6 and 6' are grounded at their left-hand ends as shown at 8 and 8'. Connected between the other input terminals 11 and 13 and having a common terminal 10 is a further pair of similar inductances 12 and 12'. The common terminal 10 is shown connected through a capacitance 14 to a ground terminal 16 and is shown connected also through an additional inductor 18 to the inner conductor 25 of the input connector A. The output terminals 17 and 23 of the pairs of inductors 2 and 4 are each connected by still a further pair of series-connected inductances 20, 20', and 22, 22', to the inner conductors 33 and 37 of the respective outlets B and C. Between the points 43 and 45 of series connection of the inductances 20, 22, and 20', 22' are connected a pair of similar capacitances 24 and 24'. The point 47 of connection of the capacitances 24 and 24' is grounded at 26 and is connected through still a further pair of inductances 28 and 28' to the other output terminals 19 and 21 of the pairs of inductors 2 and 4. Connected between inner conductors 33 and 37 of the outlets B and C is a coupling resistor or other non-phase-shifting impedance 30.

It now remains to describe the adjustment, tuning and operation of the various elements above-described that enables the effecting of the results of the present invention.

It has before been stated that the pairs of inductors 2 and 4 must be of effective electrical length less than substantially the quarter wavelength of the mid-frequency of the low-frequency band with which it is to be used. These pairs of inductors may present any desired value of impedance, such as 105 ohms. The before-mentioned inductances 22 and 22' each forms a $\pi$-section filter with the capacitances 24, $C_2$ and 24', $C_3$, respectively. The capacitances 24 and 24' serve also together with the respective inductances 20, 28 and 20', 28' as symmetrical double-L-section filters connected between the respective output terminals 17, 19 and 21, 23 of the pairs of inductors 2 and 4. Both the symmetrical $\pi$-section filters and the double-L-section filters are tuned to provide low-pass operation and to have a cut-off frequency well above the highest frequency of the high-frequency band with which the system is to operate, such as well above about 216 megacycles in the case of V. H. F. television. Each of these double-L filter sections 20, 24, 28 and 20', 24', 28' is adjusted to provide an impedance substantially the same as that presented by the pairs of inductors 2 and 4, say 105 ohms in the above illustration. Each of the $\pi$-section filters 24, 22, $C_2$ and 24', 22', $C_3$, on the other hand, is adjusted to present an impedance of substantially 0.7 times that of the pairs of inductors 2 and 4 or about 75 ohms in the above illustration. The inductance values of each of the inductances of the $\pi$-section and double-L-section filters will be considerably less than that of the inductors of the pairs of inductors 2 and 4.

Similarly, the inductance 18 forms a $\pi$-section filter with the capacitors 14 and $C_1$, and the capacitor 14 serves, also, together with the inductances 6 and 12 and 6' and 12', to provide a pair of further symmetrical double-L-section filters. Again, both this further $\pi$-section filter and the further double-L-section filters are tuned to provide a low-pass characteristic with their cut-off frequencies well above the highest frequency of the high-frequency band with which the filters are to operate.

Once again, the double-L-section filters are adjusted to present an impedance corresponding substantially to that of the pairs of inductors 2 and 4, and the $\pi$-section filter 18, 14, $C_1$ is adjusted to present an impedance equal to about 0.7 times that value.

Through this expedient, any signals at the outlet B or C will travel to the other outlet C or B through two paths: first, through the in-phase path comprising the resistor 30 which, in the above example, should have an impedance of about 150 ohms; and secondly, through the respective broad-band low-pass $\pi$-section filters $C_2$, 22, 24 and $C_3$, 22', 24' and the respective broad-band low-pass double-L-section filters 20, 24, 28 and 20', 24', 28' in series therewith, and along the less-than-quarter-wavelength pairs of inductors 2 and 4, respectively, and then through the further respective double-L-section filter sections 6, 14, 12 and 6', 14', 12', to provide out-of-phase energy at the respective inner conductors 33 and 37. The in-phase and out-of-phase energy will substantially cancel, rendering the outlets B and C, which may be terminated in matched-impedance loads, substantially independent of one another over broad frequency bands. In addition, it will be observed that the bifilar inductors 2 and 4 have their terminals ungrounded, eliminating difficulties attendant upon keeping grounding connections short in prior-art high-frequency transmission-line systems. In addition, it is not essential that the inductances connected to corresponding input and output terminals of the pairs of inductors 2 and 4 be connected to ground as it is essential that the corresponding outer-conductor terminals of prior-art transmission-line input and output terminals be grounded, as before discussed. In accordance with the present invention, to the contrary, the inductance 6 connected to the upper input terminal 9 of the pair of inductors 2 is grounded while the opposite output terminal inductance 28, not the corresponding output-terminal inductance 20, is grounded. The same remarks apply in connection with the grounding of the lower input-terminal inductance 6' and the upper output-terminal inductance 28' of the pair of inductors 4. This opposite-terminal-inductance grounding of the present invention is highly desirable and convenient for the effecting of solder connections at the ends of the bifilar inductor-windings 2 and 4. This is because in such a two-inductor parallel winding, the terminal of one of the inductors will be on the outside at one end of the form but on the inside of the corresponding end of the other inductor at the other end.

Not only can the present invention be fabricated in a small space even for long wavelengths, in view of the nature of its components, but, through the proper tuning of the $\pi$- and double-L-section low-pass filter networks, before described, the system can efficiently operate over relatively wide frequency bands in view of its relatively broad-band character.

As an illustration of typical capacitance-component values for the V. H. F. television-frequency range, assuming the filter-section and inductor impedance values before stated, the capacitances 24 and 24' may each have a value of about 3.3 micromicrofarads, and the capacitance 14, a value of about 2.2 micromicrofarads. While only a pair of outlets B and C are illustrated, further pairs of outlets may also be utilized, if desired, utilizing appropriate impedance matching.

Further modifications will occur to those skilled in the art and all such are considered to fall within the spirit and scope of the invention as defined in the appended claims.

What is claimed is:

1. An electric network for operation with a low-frequency band and a high-frequency band having, in combination, two pairs of substantially similar coiled parallel-conductor inductors of electrical length less than substantially the quarter wavelength of substantially the mid-frequency of the low-frequency band, each pair of inductors having a pair of input and a pair of output terminals; an input and at least a pair of output connectors; first and second pairs of symmetrical double-L-section low-pass filters; a pair of symmetrical π-section low-pass filters and a further π-section low-pass filter; means for connecting the first pair of symmetrical double-L-section low-pass filters in series with the pair of π-section low-pass filters between the pairs of output terminals of the pairs of parallel-conductor inductors and the pair of output connectors; means for connecting the second pair of symmetrical double-L-section low-pass filters in series with the said further π-section low-pass filter between the pairs of input terminals of the pairs of parallel-conductor inductors and the said input connector; the first and second pairs of symmetrical double-L-section low-pass filters, the pair of symmetrical π-section low-pass filters and the said further π-section low-pass filter being tuned to provide a cut-off frequency well above the highest frequency of the high-frequency band; and a coupling impedance connected between corresponding terminals of the pair of output connectors.

2. An electric network for operation with a low-frequency band and a high-frequency band having, in combination, two pairs of substantially similar coiled parallel-conductor inductors of electrical length less than substantially the quarter wavelength of substantially the mid-frequency of the low-frequency band, and having a predetermined characteristic impedance, each pair of inductors having a pair of input and a pair of output terminals; an input and at least a pair of output connectors; first and second pairs of symmetrical double-L-section low-pass filters; a pair of symmetrical π-section low-pass filters and a further π-section low-pass filter; means for connecting the first pair of symmetrical double-L-section low-pass filters in series with the pair of π-section low-pass filters between the pairs of output terminals of the pairs of parallel-conductor inductors and the pair of output connectors; means for connecting the second pair of symmetrical double-L-section low-pass filters in series with the said further π-section low-pass filter between the pairs of input terminals of the pairs of parallel-conductor inductors and the said input connector; the first and second pairs of symmetrical double-L-section low-pass filters, the pair of symmetrical π-section low-pass filters and the said further π-section low-pass filter being tuned to provide a cut-off frequency well above the highest frequency of the high-frequency band, and the said pair of π-section low-pass filters and the said further π-section low-pass filter being adjusted to present an impedance substantially equal to 0.7 times the said predetermined impedance, and each of the filters of the first and second pairs of double-L-section low-pass filters being adjusted to present an impedance substantially equal to the said predetermined impedance; and a coupling impedance connected between corresponding terminals of the pair of output connectors.

3. An electric network for operation with a low-frequency band and a high-frequency band having, in combination, two pairs of substantially similar ungrounded coiled parallel-wire inductors of electrical length less than substantially the quarter wave-length of substantially the mid-frequency of the low-frequency band, each pair of inductors having a pair of input and a pair of output terminals; an input and at least a pair of output connectors each having a pair of conductors of such dimensions and configuration as to present a shunt capacitive reactance over the low- and high-frequency bands; a first pair of inductances of value less than the inductance of the parallel-wire inductors, one inductance connected between ground and one of the input terminals of each parallel-wire inductor; a second pair of inductances, similar to the first pair, and one inductance of the second pair connected between the other input terminal of each parallel-wire inductor and a common terminal; a first capacitance connected between the common terminal and ground; a further inductance connected between the said common terminal and one of the conductors of the input connector; third and fourth pairs of similar inductances, one inductance of each of the third and fourth pairs being series-connected between one of each of the output terminals of the parallel-wire inductors and one of the conductors of the pair of output connectors; a pair of series-connected capacitances interconnecting the points of series connection of the inductances of the third and fourth pairs of inductances; a ground connection at the point of series connection of the pair of series-connected capacitances; a fifth pair of inductances connected from the said ground connection to the other of each of the output terminals of the parallel-wire inductors; the capacitances of the pair of series-connected capacitances serving with each of the inductances of the fourth pair of inductances and with the said shunt capacitive reactance of the pair of output connectors as a pair of symmetrical π-section low-pass filters and serving together with the inductances of each of the third and fifth pairs of inductances as a first pair of symmetrical double-L-section low-pass filters, and the said first capacitance serving together with the said further inductance and the said shunt capacitive reactance of the input connector as a further π-section low-pass filter and serving together with the inductances of each of the pairs of first and second pairs of inductances as a second pair of double-L-section low-pass filters; the said pair of π-section low-pass filters, the said further π-section low-pass filter and the said first and second pairs of double-L-section low-pass filters being tuned to provide a cut-off frequency well above the highest frequency of the high-frequency band; and a coupling resistor connected between a corresponding pair of conductors of the pair of output connectors.

4. An electric network for operation with a low-frequency band and a high-frequency band having, in combination, two pairs of substantially similar ungrounded coiled bifilar parallel-wire inductors of electrical length less than substantially the quarter wave-length of substantially the mid-frequency of the low-frequency band, each pair of inductors having a pair of input and a pair of output terminals; an input and at least a pair of output coaxial connectors each having an inner conductor and an outer grounded conductor and of such dimensions and configuration as to present a shunt capacitive reactance over the low- and high-frequency bands; a first pair of inductances of value less than the inductance of the parallel-wire inductors, one inductance connected between ground and one of the input terminals of each parallel-wire inductor; a second pair of inductances, similar to the first pair, one inductance of the second pair connected between the other input terminal of each parallel-wire inductor and a common terminal; a first capacitance connected between the common terminal and ground; a further inductance connected between the said common terminal and the inner conductor of the input coaxial connector; third and fourth pairs of similar inductances, one inductance of each of the third and fourth pairs being series-connected between one of each of the output terminals of the parallel-wire inductors and the inner conductors of the pair of output coaxial connectors; a pair of series-connected capacitances interconnecting the points of series connection of the inductances of the third and fourth pairs of inductances; a ground connection at the point of series connection of the pair of series-connected capacitances; a fifth pair of inductances connected from the said ground connection to the other of each of the output terminals of the parallel-wire inductors; the capacitances of the pair of series-connected capacitances serving with each of the inductances of the fourth pair of inductances and with the said shunt capacitive reactance of the pair of output connectors as a pair of symmetrical π-section low-pass filters and serving together with the inductances of each of the third and fifth pairs of inductances as a first pair of symmetrical double-L-section low-pass filters, and the said first capacitance serving together with the said further inductance and the said shunt capacitive reactance of the input connector as a further π-section low-pass filter and serving together with the inductances of each of the pairs of first and second pairs of inductances as a second pair of double-L-section low-pass filters; the said pair of π-section low-pass filters, the said further π-section low-pass filter and the said first and second pairs of double-L-section low-pass filters being tuned to provide a cut-off frequency well above the highest frequency of the high-frequency band; and a coupling resistor connected between the inner conductors of the pair of output connectors.

5. An electric network for operation with a low-frequency band and a high-frequency band having, in combination, two pairs of substantially similar ungrounded coiled bifilar parallel-wire inductors of electrical length less than substantially the quarter wave-length of substantially the mid-frequency of the low-frequency band, and having a predetermined characteristic impedance, each pair of inductors having a pair of input and a pair of output terminals; an input and at least a pair of output coaxial connectors each having an inner conductor and an outer grounded conductor and of such dimensions and configuration as to present a shunt capacitive reactance over the low- and high-frequency bands; a first pair of inductances of value less than the inductance of the parallel-wire inductors, one inductance connected between ground and one of the input terminals of each parallel-wire inductor; a second pair of inductances, similar to the first pair, one inductance of the second pair connected between the other input terminal of each parallel-wire inductor and a common terminal; a first capacitance connected between the common terminal and ground; a further inductance connected between the said common terminal and the inner conductor of the input coaxial connector; third and fourth pairs of similar inductances, one inductance of each of the third and fourth pairs being series-connected between one of each of the output terminals of the parallel-wire inductors and the inner conductors of the pair of output coaxial connectors; a pair of series-connected capacitances interconnecting the points of series connection of the inductances of the third and fourth pairs of inductances; a ground connection at the point of series connection of the pair of series-connected capacitances; a fifth pair of inductances connected from the said ground connection to the other of each of the output terminals of the parallel-wire inductors; the capacitances of the pair of series-connected capacitances serving with each of the inductances of the fourth pair of inductances and with the said shunt capacitive reactance of the pair of output connectors as a pair of symmetrical π-section low-pass filters and serving together with the inductances of each of the third and fifth pairs of inductances as a first pair of symmetrical double-L-section low-pass filters, and the said first capacitance serving together with the said further inductance and the said shunt capacitive reactance of the input connector as a further π-section low-pass filter and serving together with the inductances of each of the pairs of first and second pairs of inductances as a second pair of double-L-section low-pass filters; the said pair of π-section low-pass filters, the said further π-section low-pass filter and the said first and second pairs of double-L-section low-pass filters being tuned to provide a cut-off frequency well above the highest frequency of the high-frequency band; and the said pair of π-section low-pass filters and the said further π-section low-pass filter being adjusted to present an impedance substantially equal to 0.7 times the said predetermined impedance, and each of the filters of the first and second pairs of double-L-section filters being adjusted to present an impedance substantially equal to the said predetermined impedance; and a coupling resistor connected between the inner conductors of the pair of output connectors.

6. An electric network as claimed in claim 5 and in which the said mid-frequency of the low-frequency band is substantially one-third the mid-frequency of the high-frequency band.

No references cited.